UNITED STATES PATENT OFFICE.

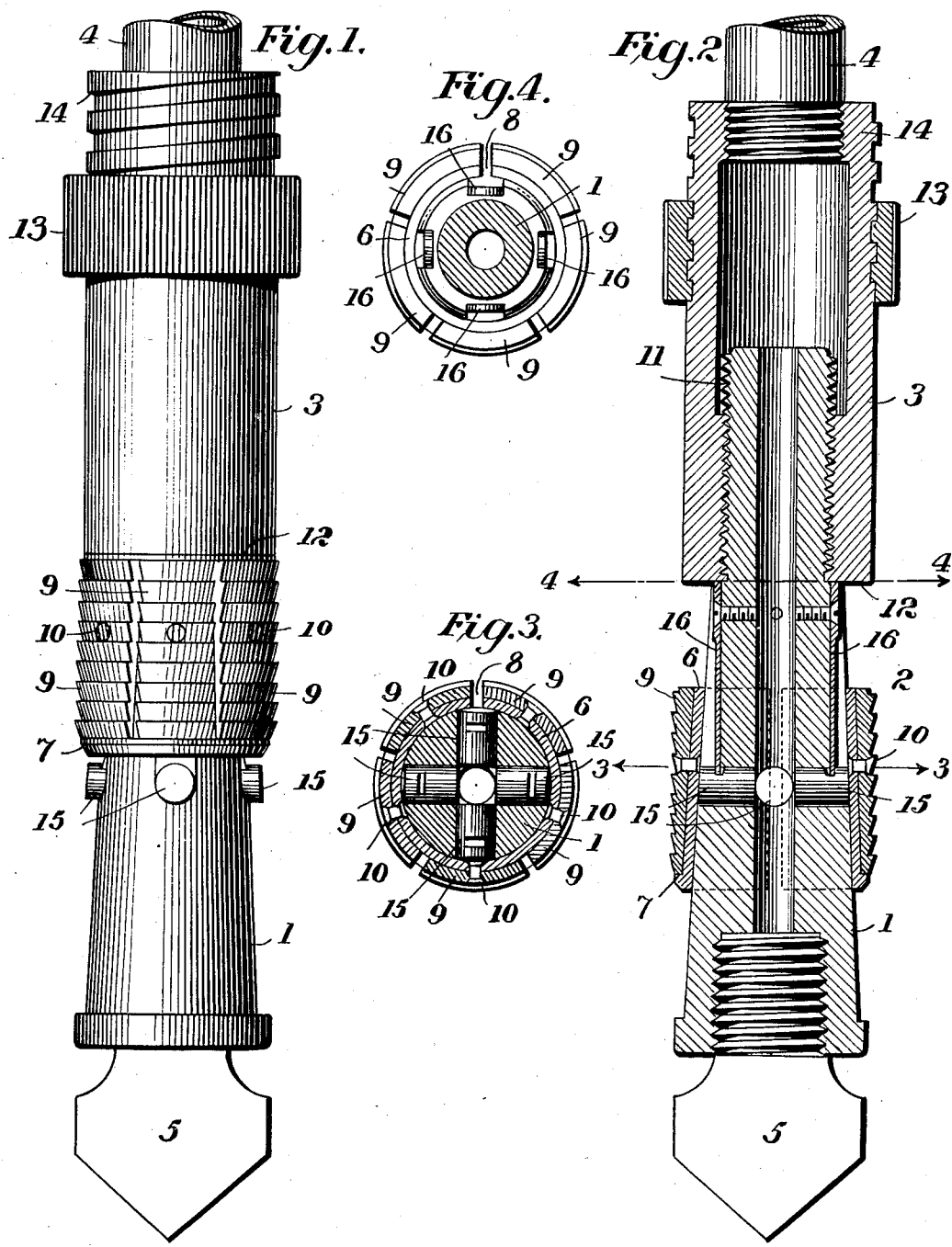

MONROE W. CARROLL, OF BEAUMONT, TEXAS, ASSIGNOR OF ONE-HALF TO H. G. JOHNSTON, OF CORSICANA, TEXAS.

CASING-SPEAR.

No. 897,250.  Specification of Letters Patent.  Patented Aug. 25, 1908.

Application filed September 13, 1907. Serial No. 392,698.

*To all whom it may concern:*

Be it known that I, MONROE W. CARROLL, a citizen of the United States, and resident of Beaumont, in the county of Jefferson, State of Texas, have invented certain new and useful Improvements in Casing-Spears, of which the following is a specification.

This invention relates to an apparatus for withdrawing from wells tubes or casings which have been broken off or otherwise lodged therein some distance from the top.

One of its objects is to improve the expansive gripping member whereby it shall have the proper flexibility for expansion and at the same time will have gripping teeth of sufficient hardness to prevent undue wearing and to insure the proper gripping action.

Another object is to improve the means for tripping the gripping member so as to release it from the casing in the well after engagement therewith and so as to permit the spear to be withdrawn from the well where it is impossible to draw the casing out with it. This tripping action in my device may be secured by a simple manipulation of the operating rod by which the spear is normally raised and lowered and without lowering into the well any separate trip operating device.

Other objects and advantages of the invention will be clear from the following description.

In the accompanying drawings: Figure 1 is a side view of the casing spear, the operating rod being broken away; Fig. 2 is a longitudinal section of the construction shown in Fig. 1; Fig. 3 is a cross section taken on the line 3—3 of Fig. 2, and Fig. 4 is a cross section taken upon the line 4—4 of Fig. 2.

My casing spear is made up of three main parts which are the tapered arbor 1, the expansible gripping member 2 mounted thereon, and the coupling 3, which connects the tapered arbor with the operating rod 4. I have shown the tapered arbor as carrying at its lower end the penetrating point 5, which is usual in this class of devices. The gripping member 2 is made up of the conical split ring 6 which is made from spring metal and which has a shoulder or ledge 7 around its bottom. This ring is split vertically from top to bottom at the point marked 8 so as to permit it to expand as it descends on the conical arbor 1. On the outer surface of this conical ring are placed the vertical sections 9 of hard metal provided with the usual teeth for engaging the casing which is to be withdrawn from the well. These sections are made thicker at the top than at the bottom so that the outer surface of the teeth will conform generally to the shape of the cylinder. These sections are riveted to the split ring 6 by rivets 10 and rest at their lower ends upon the flange 7. It will be noted that this construction of gripping member produces a device which has as much flexibility as is desired since the split ring 6 may be made as thin or as flexible as the manufacturer may wish, and it also produces a device in which the teeth may be hardened to any degree desired.

It has been found that attempts to make the gripping ring of one piece of metal have not been completely successful, since where the metal is tempered to have the proper spring action the teeth forming a part of it will be too soft to serve the purpose of efficiently engaging and withdrawing the casing. On the other hand, if the teeth are made sufficiently hard, the ring will be too stiff and brittle to expand freely and properly for the purpose of engaging the casing. The object of my construction is to secure the advantages of both the hard and the soft ring without the disadvantages of either.

The arbor 1 is connected to the coupling 3 by a long screw-threaded connection 11, and it will be noted that the lower end of the coupling 3 projects some distance beyond the circumference of the upper end of the tapered portion of the arbor 1, thus forming a shoulder 12 against which the upper end of the gripping member may abut.

Mounted upon the coupling 3 is a nut 13 carried by the screw-threads 14 which extend to the upper end of the coupling. This nut has a square lower edge and is intended to engage the upper end of the casing which is to be withdrawn. The engagement of this nut with the upper end of the casing indicates to the operator when the spear is inside cates to the operator when the spear is inside the casing and in position to engage it for the purpose of withdrawing it. If the pipe is split or for any other reason the gripping means cannot secure a good hold at that point, the operator may, by rotating the rod 4, unscrew the nut 13 from the coupling 3, thus letting the spear descend further into the casing.

Mounted in the arbor 1 are the lugs 15 which are engaged by the springs 16 tending normally to force those lugs outward beyond the circumference of the tapered arbor. These lugs are placed in the arbor a distance below the shoulder 12 less than the length of the split ring 6, so that these lugs will normally be prevented from projecting beyond the surface of the arbor by contact with the interior surface. These lugs are for the purpose of tripping the gripping means so as to prevent it from descending on the tapered arbor and from expanding to engage the casing to be withdrawn. In order to bring them into operation and allow them to project from the arbor below the end of the ring 6 for the purpose of supporting it, as shown in Fig. 1, it is necessary to elevate the shoulder 12 against which the upper end of the ring 6 abuts. This is done by a few turns of the coupling 3 in the direction to unscrew it from the screw threads 11, and it is to be understood that this operation may be effected by turning the rod 4 in cases where the gripping means is in engagement with the casing to be removed so that it cannot rotate. This tripping means is intended primarily for use when the spear has engaged a casing which it is found impossible to remove, and when it is therefore desired to remove the spear from the well so that it will not be lost as well as the casing. The gripping means being in engagement with the casing, all that it is necessary for the operator to do to trip it is to turn the rod 4 a few times in the proper direction to partly unscrew the coupling 3, and then give a downward thrust to the rod 4 whereby the arbor 1 will slide downward through the gripping ring 2 until the lugs 12 project below its lower end. The entire device may then be withdrawn from the well without again bringing the gripping means into engagement with the casing.

It will be understood that the lugs 15 may be of any desired form, and may be operated in any suitable way to make them automatically tend to project from the surface of the arbor 1. It will be noted that this construction prevents the tripping of the gripping means when it is being inserted in the well, but at the same time permits the operator to trip it whenever desired by mere manipulation of the operating rod by which the spear is elevated and lowered, and without the intervention of any other or separate trip operating mechanism.

I prefer to make the ring 6 of spring steel and prefer to make the rod 4 in the shape of a tube, but this is not essential. It will be understood that the threads for the connection 11 extend in the opposite direction from the threads for the nut 13 so that to operate one it is necessary to turn the rod in the opposite direction from that necessary in operating the other.

Having thus described the invention, what is claimed and desired to be secured by Letters Patent is:

1. A gripping member for casing spears made up of a split ring of spring metal and hardened gripping projections attached thereto.

2. A gripping member for casing spears made up of a conical split ring of spring metal having riveted to its outer surface sections of hardened metal provided with gripping projections.

3. In a casing spear, the combination with the spear head including expansible gripping means, of an operating rod for raising and lowering said spear head, tripping devices within said head, and connections between said rod and head whereby a rotation of the rod in one direction permits said tripping devices to come into play.

4. In a casing spear, the combination with a tapered arbor, of an expansible gripping member slidably mounted thereon, a coupling screw threaded to the upper end of said arbor and forming an abutment for the upper end of said gripping member and lugs in said arbor bearing normally against the inner surface of said gripping member a distance from said coupling less than the length of the gripping member and adapted to project beneath said gripping member when the coupling is partly unscrewed from the arbor.

5. In a casing spear, the combination with a tapered arbor of a split conical expansible gripping ring slidably mounted thereon, a coupling having long screw-threaded connection with the upper end of said arbor and forming an abutment for the upper end of said gripping ring and spring pressed lugs mounted in said tapered arbor bearing outwardly against the inner surface of said ring a distance from the lower end of the coupling less than the width of the conical ring and adapted to project beneath said gripping member when the coupling is partly unscrewed from the arbor.

6. In a casing spear, the combination with a spear head including expansible gripping means of an operating rod for raising and lowering said head and an adjustable nut above said head of such size as to engage and rest upon the top of the casing to be engaged by the expansible gripping means.

7. In a casing spear, the combination with a spear head including expansible gripping means of an operating rod for raising and lowering said head, a coupling joining said parts, a nut on said coupling and screw threads for said nut extending to the upper end of said coupling.

8. In a casing spear the combination with a tapered arbor, of an expansible gripping member slidably mounted thereon, a coupling adjustably secured to the upper end of said arbor and forming an abutment for the upper end of said gripping member, and lugs adapted to engage and support said gripping member when said member and the coupling are in their upper adjusted positions.

In testimony whereof I affix my signature in presence of two witnesses.

MONROE W. CARROLL.

Witnesses:
F. T. SMITH,
EMMETT T. FLETCHER.